Patented Feb. 3, 1948

2,435,474

UNITED STATES PATENT OFFICE 2,435,474

METHOD OF INHIBITING THE PRECIPITATION OF LITHIUM SOAP IN AN AQUEOUS SOLUTION OF LITHIUM HYPOCHLORITE

Edward C. Soule, Niagara Falls, N. Y., assignor to The Mathieson Alkali Works, Inc., New York, N. Y., a corporation of Virginia No Drawing. Application March 19, 1943, Serial No. 479,780

11 Claims. (Cl. 252—97)

This invention relates to improvements in various operations, for instance cleansing, sterilizing, disinfecting and the like, wherein aqueous solutions containing lithium compounds are used. It relates more particularly to the prevention of the precipitation of lithium soaps and other difficultly soluble lithium compounds from such solutions by the presence of a water-soluble polyphosphate, i. e. a phosphate containing more than one atom of phosphorus per molecule of phosphate.

The invention is especially applicable to processes wherein the use of a clear hypochlorite solution is desirable and wherein lithium hypochlorite may be used with advantage, and will be illustrated with reference to such processes. This aspect of the invention contemplates either the concurrent or separate addition of the lithium hypochlorite and polyphosphate to the solution. The invention also contemplates a solid stable product comprising lithium hypochlorite and a water-soluble polyphosphate by the use of which clear hypochlorite water solutions may be directly obtained.

Though lithium is usually considered as belonging to the alkali metal group, it is distinguished from the other members of that group in several important respects. Lithium compounds are relatively rare and expensive. Their use in the industries employing compounds of other members of the alkali metal group has heretofore been very limited and until recently relatively little has been known concerning the characteristics and behavior of lithium compounds. For example, the salts and soaps of sodium and potassium are generally highly soluble in water. This is also true of the compounds of ammonia, sometimes grouped with the alkali metals. On the other hand, lithium soaps have been found to be only slightly soluble in water and many of the lithium salts are difficultly soluble.

I have found that when soluble lithium compounds are used in aqueous solution in the presence of the common soaps of other alkali metals, such as sodium and potassium, there is a tendency for the lithium to displace the metal constituents of such soaps and to form relatively insoluble lithium soaps, which precipitate and cloud the solution. Also, where soluble lithium compounds are used in aqueous solution in the presence of various other salts, for instance those ionizing to form fluoride, carbonate, orthophosphate or silicate ions, difficultly soluble lithium compounds are formed and precipitate out of solution. It is one object of the present invention, in its broader aspect, to maintain in aqueous solution these relatively insoluble lithium compounds.

I have discovered that the precipitation of such lithium compounds may be substantially completely prevented or materially inhibited by the presence of a water-soluble polyphosphate.

In cleansing and disinfecting operations, for instance, where hypochlorites are customarily employed, it is desirable to use clear water solutions. Calcium hypochlorite, commonly used for some purposes, gives a cloudy suspension in water and must be settled and decanted in order to obtain a clear aqueous solution of calcium hypochlorite. An alternate procedure is to add sodium carbonate to the calcium hypochlorite suspension whereby a clear aqueous solution of sodium hypochlorite is obtained after agitation and settling.

Sodium and potassium hypochlorites are relatively less stable than calcium hypochlorite and, while they may be prepared and shipped in the form of a clear solution, such preparations are expensive and relatively unstable with respect to the available chlorine. It is also possible to prepare an unstable pentahydrate of sodium hypochlorite which is solid below temperatures of about 30° C. While it is possible to obtain clear solutions of hypochlorites by dissolving this solid in water, the solid material is not suitable for shipping and storing because of its relative instability and its low melting point.

Furthermore, in laundering and scouring operations, for example, the concurrent use of hypochlorites for bleaching and soap for cleansing, with or without the addition of silicates, orthophosphates or the like, is frequently required. In addition to yielding a clear solution in water, it is desirable that the hypochlorite composition should not form insoluble matter by reacting with soap, soap builders such as silicates or phosphates or with other components of the solutions involved in its use.

Though the art has fully appreciated the desirability of obtaining a hypochlorite product in solid form, which is stable under the conditions of shipment and storage and from which a clear solution may be directly obtained and maintained under the conditions of use, a hypochlorite composition having these characteristics has not heretofore been available.

It is a further object of the invention to provide a process wherein hypochlorite may be supplied as lithium hypochlorite and in which the precipitation of insoluble lithium compounds is avoided.

A still further object of this invention is to provide a solid, stable hypochlorite composition which, when added to water, especially in the presence of soap and soap builders, will yield clear solutions under the conditions ordinarily encountered in the use of hypochlorites.

Lithium hypochlorite has been found to be more stable than the hypochlorites of other alkali metals. It may, for instance, be economically prepared free from contaminating lithium chloride by the processes described in my co-pending applications Serial No. 479,778, filed March 19, 1943, and Serial No. 479,779, filed March 19, 1943, now abandoned, either as an aqueous solution or as a solid product. Solid lithium hypochlorite compositions heretofore available have invariably contained not less than about 30.7% of water based on the lithium hypochlorite present, i. e. an amount of water equivalent to the monohydrate.

A particularly desirable source of lithium hypochlorite for use in the solid product of my present invention is that described in the copending application of Homer L. Robson and the present applicant, Serial No. 475,174, filed February 8, 1943, now abandoned, which is a stable, solid lithium hypochlorite composition of unusually low water content, i. e. substantially less than the monohydrate, and containing about 100% or more available chlorine. In this substantially anhydrous form, this lithium hypochlorite composition is a particularly desirable constituent of my present product though less dehydrated lithium hypochlorite compositions may also be used with advantage. Lithium hypochlorite in either of these forms may be shipped and stored at reasonable temperatures and, when added to water alone, yield clear solutions.

However, unlike other alkali metal soaps, lithium soaps are only slightly soluble in water and many lithium salts are difficultly soluble. Thus, while lithium hypochlorite alone is outstandingly satisfactory with respect to stability, available chlorine content and the production of clear aqueous solutions, its use has been greatly restricted because of the relative insolubility of many of its compounds, and especially of its soaps, formed under the conditions usually encountered in its practical use.

I have discovered that the difficulties heretofore experienced in such use of lithium hypochlorite, due to the formation of insoluble lithium soaps, salts and the like, may be avoided by the presence in the lithium hypochlorite solution of suitable proportions of a water-soluble polyphosphate such as the polyphosphates of sodium or potassium. By such addition of polyphosphates to the lithium hypochlorite solution, the precipitation of insoluble lithium compounds normally occurring when lithium hypochlorite is added to water containing various salts and especially soap, is prevented.

Examples of polyphosphates which I have found particularly effective for this purpose are sodium tetra-meta-phosphate, $Na_4P_4O_{12}$, sodium penta-meta-phosphate, $Na_5P_5O_{15}$, sodium hexameta-phosphate, $Na_6P_6O_{18}$, sodium tetraphosphate, $Na_6P_4O_{13}$, sodium tripolyphosphate, $$Na_5P_3O_{10}$$

and sodium pyrophosphate, $Na_4P_2O_7$. Pyrophosphates have been found especially effective. The corresponding polyphosphates of potassium may also be used with advantage.

For the purpose of the instant disclosure including the appended claims the pyrophosphates, although sometimes otherwise classified, are to be considered as polyphosphates.

Though, in accordance with my improved process, the lithium hypochlorite and the polyphosphate may be supplied separately and added to the solution either separately or concurrently, these two materials may be more conveniently and advantageously used, and with less possibility of incorrect use, if supplied as a single composition in proper proportions.

I have found intimate admixtures of lithium hypochlorite and polyphosphates in solid form to be stable under conditions normally encountered in shipment and storage and I prefer to use these materials in that form.

Usually a somewhat larger proportion of the polyphosphate to the hypochlorite than 1:1 is desirable. I prefer to use not less than about 50% by weight (based on these active ingredients) of the polyphosphate and not more than about 50% by weight of a lithium hypochlorite composition containing approximately 100% of available chlorine. Lithium hypochlorite preparations containing substantially less than 100% available chlorine may be used in the process or in preparing the solid product of my invention but in such case it is desirable to increase the percentage of the lithium-hypochlorite-containing component and in some cases this constituent may amount to more than 50% by weight.

I have found that the polyphosphate constituents of my improved product may, if desired, be as high as about 99% by weight and the hypochlorite constituent as low as 1% or slightly less. However, a particularly advantageous composition for general use is one comprising approximately 90% of polyphosphate and about 10% of a lithium hypochlorite product having an available chlorine content of about 100%.

In using the composition last mentioned, 1 part thereof added to 1000 parts of water or to 1000 parts of an 0.1% soap solution, will yield a solution containing about 100 parts per million of available chlorine and 900 parts per million of the polyphosphate. This represents approximately the usual amount of available chlorine used in ordinary laundering and disinfecting operations and the percentage of polyphosphate present is sufficient to maintain the lithium soap, or other insoluble lithium compound customarily encountered, in solution at temperatures ordinarily used.

The proportion of polyphosphate may be varied considerably to meet particular requirements. However, compositions containing from about 80 to 95% of polyphosphate, based on the weight of the active ingredients, have been found especially suitable in practical operations ordinarily encountered. Where the hypochlorite and polyphosphate are added separately, similar proportions may advantageously be used.

Inert diluents, including various inorganic salts, may be present in my composition without materially interfering with its practical use. The proportions of such inert materials present may, for example, be as high as 50% or more of the total weight of the composition. It will be noted, however, that the percentages of lithium hypochlorite and of polyphosphates appearing herein and in the appended claims are based on the weight of the active ingredients present, i. e. lithium hypochlorite and polyphosphates.

The invention will be further illustrated by the following specific examples, in each of which the lithium hypochlorite used was a solid, substantially anhydrous stable product containing 98.1% available chlorine and having the following analysis by weight:

| | Per cent |
|---|---|
| Lithium hypochlorite | 80.6 |
| Chlorate (as LiClO₃) | 2.84 |
| Chloride (as LiCl) | 3.59 |
| Alkalinity (as LiOH) | 10.45 |
| Water (by difference) | 2.52 |
| Total | 100.00 |

Example I

A mixture of 10 parts of the above lithium hypochlorite composition and 90 parts of sodium hexa-meta-phosphate was prepared by mixing the dry solids. 1 part of this admixture was added to 1000 parts of 0.1% soap solution at 70° C. and no precipitation occurred even after standing for in excess of ½ hour. The solution contained approximately 1000 parts per million of soap, 100 parts per million of available chlorine and 900 parts per million of sodium hexa-meta-phosphate.

Example II 5 parts of the previously noted lithium hypochlorite was admixed, as in Example I, with 95 parts by weight of sodium tetraphosphate. 1 part of this composition was added to 500 parts of an 0.1% soap solution to obtain a composition containing 100 parts per million of available chlorine, 1900 parts per million of sodium tetraphosphate and 1000 parts per million of soap. The solution was clear and remained clear indefinitely at temperatures above 35° C.

Example III

A solid, stable composition containing 90% of tetrasodium pyrophosphate and 10% of the lithium hypochlorite, when used as described in the foregoing examples, gave similar results. In no one of the above cases was the precipitation of lithium soap apparent.

Example IV

Further to illustrate the efficacy of polyphosphates in preventing the formation of insoluble lithium soaps and the like in accordance with my present invention, the following tabulation of comparative results, using lithium hypochlorite with and without the use of polyphosphates, is presented. In carrying out the experiments from which the tabulated data was obtained, lithium hypochlorite having the analysis previously given herein was made into an aqueous stock solution containing 0.00311 gram of available chlorine per milliliter. 5 milliliters of this solution, diluted to 150 milliliters, gave a solution containing approximately 100 parts per million of available chlorine, which, as previously noted, is about the usual concentration used for laundering and disinfecting operations. A stock solution was also made up containing 0.1% soap and 0.01% sodium silicate, Na₂SiO₃.9H₂O. The sodium silicate is known as a soap builder and it or its equivalent is usually present in laundering operations.

To 150 milliliters of this stock soap solution was added the polyphosphate in proportions and at the mixing temperature indicated in the following tabulation. 5 milliliters of the stock lithium hypochlorite solution previously mentioned was added in each experiment and the solution well mixed.

The particular polyphosphate added, the proportion thereof, temperatures employed and results observed were as follows:

| No. | 1 | 2 | 3 | 4 | 5 | 6 | 7 | 8 | 9 | 10 |
|---|---|---|---|---|---|---|---|---|---|---|
| Polyphosphate Agent, percent | None | | | | | | | | | |
| Sodium Hexameta-phosphate | | .04 | .067 | .1 | | | | | | |
| Sodium Tetraphosphate | | | | | .1 | .134 | .20 | | | |
| Tetra Sodium Pyrophosphate | | | | | | | | .1 | .167 | .233 |
| Temperature of Mixing, °C | 70 | 72 | 75 | 60 | 60 | 60 | 60 | 60 | 60 | 60 |
| Temperature of First Appear. of Precipitate, °C | 70 | 57 | 60 | 55 | 45 | 40 | 35 | 53 | 45 | 30 |
| Temperature of Heavy Precipitation, °C | 70 | 45 | 55 | 50 | (¹) | (¹) | (¹) | 45 | 39 | (¹) |
| Re-solution Temperature, °C | (²) | 70 | 70 | 75 | 50 | 48 | 50 | 70 | 60 | |

¹ Below room temperature.
² Above boiling point of the solution.

From the foregoing it appears that, in the first of these tests wherein no polyphosphate was used, lithium soap was precipitated even at a mixing temperature of 70° C. and therefore such a solution containing approximately 100 parts per million of available chlorine would not be satisfactory for use in laundering. However, the presence of as little as 0.04% of sodium hexa-meta-phosphate in the solution prevented the precipitation of lithium soap until the temperature had dropped to 57° C. and a heavy precipitate was not obtained under such conditions at temperatures in excess of 45° C. Similarly, 0.1% or more of sodium tetraphosphate or sodium pyrophosphate in these solutions was sufficient to maintain clear solutions which would be satisfactory for laundering operations. For instance, using only 0.1% of sodium tetraphosphate, a heavy precipitation of lithium soap did not occur until the temperature had dropped below room temperature.

As previously noted, the polyphosphates are compatible with lithium hypochlorite in dry, solid form and admixtures thereof are stable, and, in the absence of substantial proportions of lithium chloride, are free from objectionable deliquescence, and capable of withstanding conditions normally encountered in shipment and storage without material decomposition or loss in available chlorine content.

Though the invention has been particularly described and illustrated by reference to the use of lithium hypochlorite as the soluble lithium compound, it will be understood that my improved method of preventing the precipitation of insoluble lithium soaps and salts is not dependent upon the presence of hypochlorite ions in the solution but is applicable generally to solutions of soluble lithium compounds such as the choride, chlorate or hydroxide. In solutions of soluble lithium compounds, generally, containing soap or ions such as fluoride, carbonate, orthophosphate or silicate ions which combine with lithium to form insoluble lithium compounds, the precipitation of such normally insoluble lithium compounds is inhibited by the presence of the polyphosphate whether or not hypochlorite ions are present.

The amounts of polyphosphate to be added will generally depend upon the amount of lithium ions present. In more concentrated solutions, larger amounts of polyphosphate will be required to prevent precipitation of the insoluble lithium compounds from solution. Generally, an amount of polyphosphate approximately equal to the amount of soluble lithium compound in the solution, by weight, will be found to give favorable results. Somewhat larger or smaller proportions of polyphosphate, for instance such as previously illustrated herein with reference to lithium hypochlorite, may be used with advantage.

I claim:

1. The method of inhibiting the precipitation of a lithium soap in an aqueous solution of lithium hypochlorite and a soap from the class consisting of sodium and potassium soaps which comprises adding a water-soluble polyphosphate to the solution in an amount at least equal by weight to the lithium hypochlorite present.

2. The method of inhibiting the precipitation of a lithium soap in an aqueous solution of lithium hypochlorite and a soap from the class consisting of sodium and potassium soaps which comprises adding to the solution an amount of a water-soluble polymetaphosphate sufficient to give a weight ratio of polymetaphosphate to hypochlorite within the range 8:2 to 9.5:0.5.

3. The method of inhibiting the precipitation of a lithium soap in an aqueous solution of lithium hypochlorite and a soap from the class consisting of sodium and potassium soaps which comprises adding to the solution an amount of a water-soluble pyrophosphate sufficient to give a weight ratio of pyrophosphate to hypochlorite within the range 8:2 to 9.5:0.5.

4. The method of inhibiting the precipitation of a lithium soap in an aqueous solution of lithium hypochlorite and a soap from the class consisting of sodium and potassium soaps which comprises adding to the solution an amount of a water-soluble tetraphosphate sufficient to give a weight ratio of tetraphosphate to hypochlorite within the range of 8:2 to 9.5:0.5.

5. The method of inhibiting the precipitation of a lithium soap in an aqueous solution of lithium hypochlorite and a soap from the class consisting of sodium and potassium soaps which comprises adding to the solution an amount of sodium hexa-metaphosphate sufficient to give a metaphosphate:hypochlorite ratio by weight of about 9:1, the lithium hypochlorite having an available chlorine content of approximately 100%.

6. The method of inhibiting the precipitation of a lithium soap in an aqueous solution of lithium hypochlorite and a soap from the class consisting of sodium and potassium soaps which comprises adding to the solution an amount of sodium pyrophosphate sufficient to give a pyrophosphate:hypochlorite ratio by weight of about 9:1, the lithium hypochlorite having an available chlorine content of approximately 100%.

7. The method of inhibiting the precipitation of a lithium soap in an aqueous solution of lithium hypochlorite and a soap from the class consisting of sodium and potassium soaps which comprises adding to the solution an amount of sodium tetraphosphate sufficient to give a tetraphosphate:hypochlorite ratio by weight of about 9:1, the lithium hypochlorite having an available chlorine content of approximately 100%.

8. A stable, solid hypochlorite composition comprising from 5–20% lithium hypochlorite and from 80–95% sodium hexa-metaphosphate by weight, the lithium hypochlorite being substantially anhydrous and having an available chlorine content of approximately 100%.

9. A stable, solid hypochlorite composition comprising from 5–20% lithium hypochlorite and from 80–95% sodium pyrophosphate by weight, the lithium hypochlorite being substantially anhydrous and having an available chlorine content of approximately 100%.

10. A stable, solid hypochlorite composition comprising approximately 90% of sodium hexametaphosphate and approximately 10% of lithium hypochlorite by weight, the lithium hypochlorite conforming substantially to the following analysis:

| | Per cent |
|---|---|
| Lithium hypochlorite | 80.6 |
| Chlorate (as $LiClO_3$) | 2.84 |
| Chloride (as LiCl) | 3.59 |
| Alkalinity (as LiOH) | 10.45 |
| Water (by difference) | 2.52 |

11. A stable, solid hypochlorite composition comprising approximately 90% of sodium pyrophosphate and approximately 10% of lithium hypochlorite by weight, the lithium hypochlorite conforming substantially to the following analysis:

| | Per cent |
|---|---|
| Lithium hypochlorite | 80.6 |
| Chlorate (as $LiClO_3$) | 2.84 |
| Chloride (as LiCl) | 3.59 |
| Alkalinity (as LiOH) | 10.45 |
| Water (by difference) | 2.52 |

EDWARD C. SOULE.

REFERENCES CITED

The following references are of record in the file of this patent:

UNITED STATES PATENTS

| Number | Name | Date |
|---|---|---|
| 2,092,913 | Fiske | Sept. 14, 1937 |
| 2,097,517 | Durgin | Nov. 2, 1937 |
| 2,356,820 | Cady | Aug. 29, 1944 |
| Re. 19,719 | Hall | Oct. 8, 1935 |
| 2,059,570 | Fiske | Nov. 3, 1936 |

OTHER REFERENCES

Modern Soap and Detergent Industry, Martin, Crosby, Lockwood & Son, London (1931), volume 1, section 1, page 11.